Feb. 14, 1956 S. A. HERRES 2,734,244
PROCESS OF REFINING AND MELTING TITANIUM
Filed Feb. 8, 1951 3 Sheets-Sheet 2

INVENTOR.
Schuyler A. Herres
BY Green, McCallister & Miller
HIS ATTORNEYS

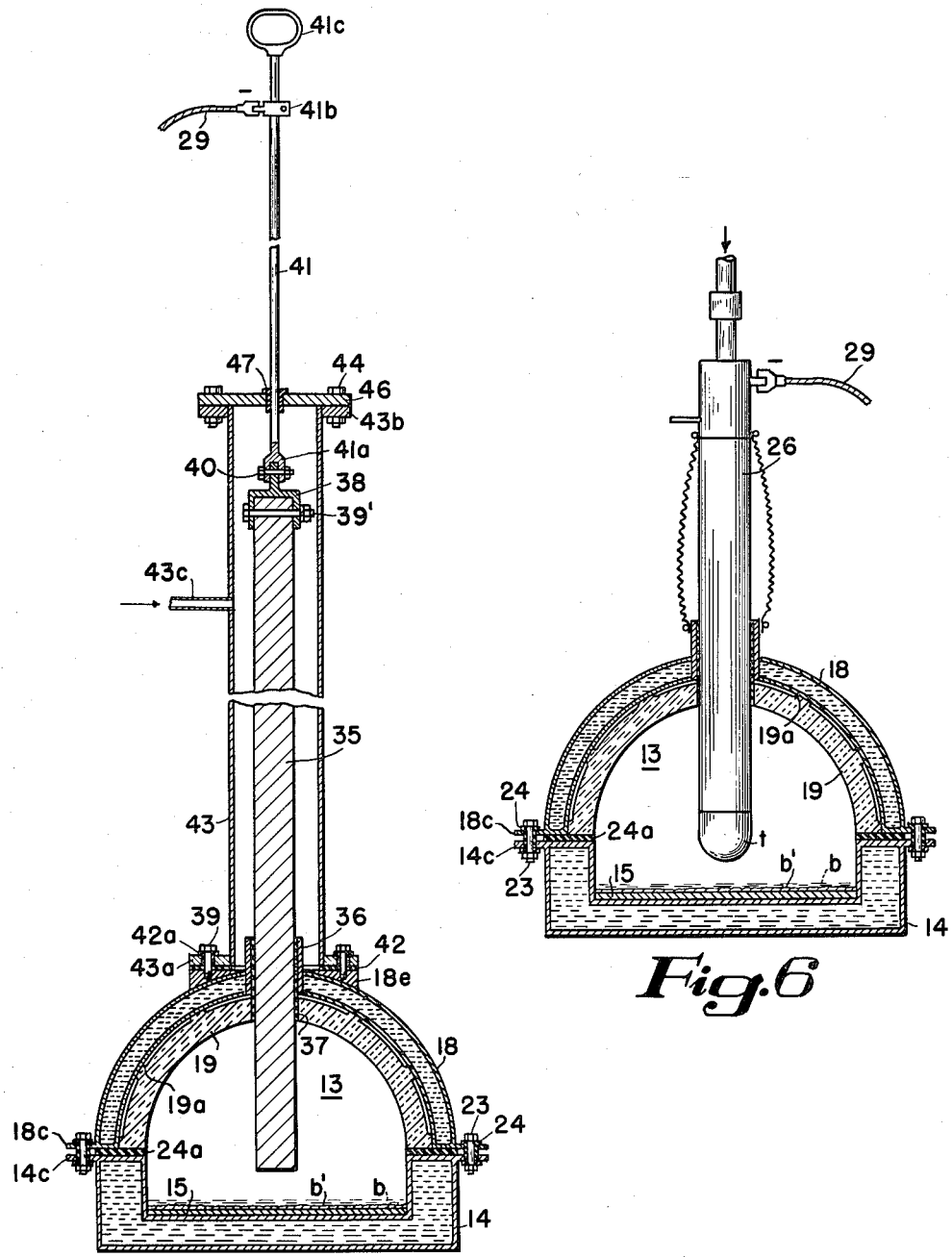

United States Patent Office 2,734,244
Patented Feb. 14, 1956

2,734,244

PROCESS OF REFINING AND MELTING TITANIUM

Schuyler A. Herres, Albany, N. Y., assignor to Allegheny Ludlum Steel Corporation, Brackenridge, Pa., a corporation of Pennsylvania Application February 8, 1951, Serial No. 209,994

7 Claims. (Cl. 22—214)

This invention deals with refining and making pure metal ingots from impure base metal or scrap, or directly from metal compounds. In particular, it deals with procedure and apparatus for transforming unrefined titanium metal or a titanium compound directly into a pure metal ingot.

An overall phase of my invention relates to the conversion of metal compound into an aggregate consisting of a reaction product and unrefined metal, breaking up the aggregate and segregating the metal, feeding such metal into a melting furnace, preliminarily heating up such metal and refining it to remove residual impurities as volatiles, melting the refined metal, and then solidifying the pure or refined metal in ingot form.

Another phase of my invention relates the refining and melting down of titanium in the form of scrap, acid-leached, halide-reduced, powder or sponge metal in an electric arc furnace to form a pure metal ingot.

Although titanium has been produced in limited quantities by so-called laboratory or batch methods, no one has heretofore been able to successfully directly transform it from a metal compound into commercial, pure ingot metal form. My previous work in this field has indicated that where, for example, a titanium halide is reduced by a suitable reducing metal or gas, a mass aggregate is produced whose pores are substantially filled with such reaction product and with any excess reducing material. Decanting, vacuum distillation, and other complex separation steps have been used in an endeavor to segregate the titanium metal or value content, in order to ready it for a melting operation.

This application is a continuation-in-part of my copending and now abandoned application, Serial No. 109,885, filed August 12, 1949, and entitled "Titanium Reduction." This latter application discloses a reaction tube apparatus that is here shown inclined upwardly toward its delivery end and combined with a novel form of melting furnace to carry out my new, simplified and direct procedure. It is also a continuation-in-part of my copending application No. 175,091, now Patent No. 2,665,318 of January 5, 1954, which discloses an arc-melting apparatus and also that titanium, zirconium and other similar relatively high melting point metals are extremely sensitive to contaminating materials such as gases.

It has thus been an object of my invention to provide a new and improved procedure and apparatus arrangement for making metal ingots, and particularly titanium ingots;

Another object has been to provide an arrangement for directly or continuously producing metal ingots from metal compounds;

A further object has been to provide an improved furnace installation for refining metal, melting it down, and forming it into ingots;

These and many other objects of my invention will be apparent to those skilled in the art from the described embodiments of my invention and the claims.

In the drawings, Figure 1 is a somewhat diagrammatic apparatus layout in vertical side elevation and partial section illustrating an overall arrangement for carrying out my invention;

Figure 6 is an end sectional view in elevation taken along the line IV—IV or V—V of Figure 1 and illustrating a modified construction;

Figure 7 is an end sectional view in elevation taken along the line IV—IV or V—V of Figure 1 and illustrating a further modified construction.

Figure 1:
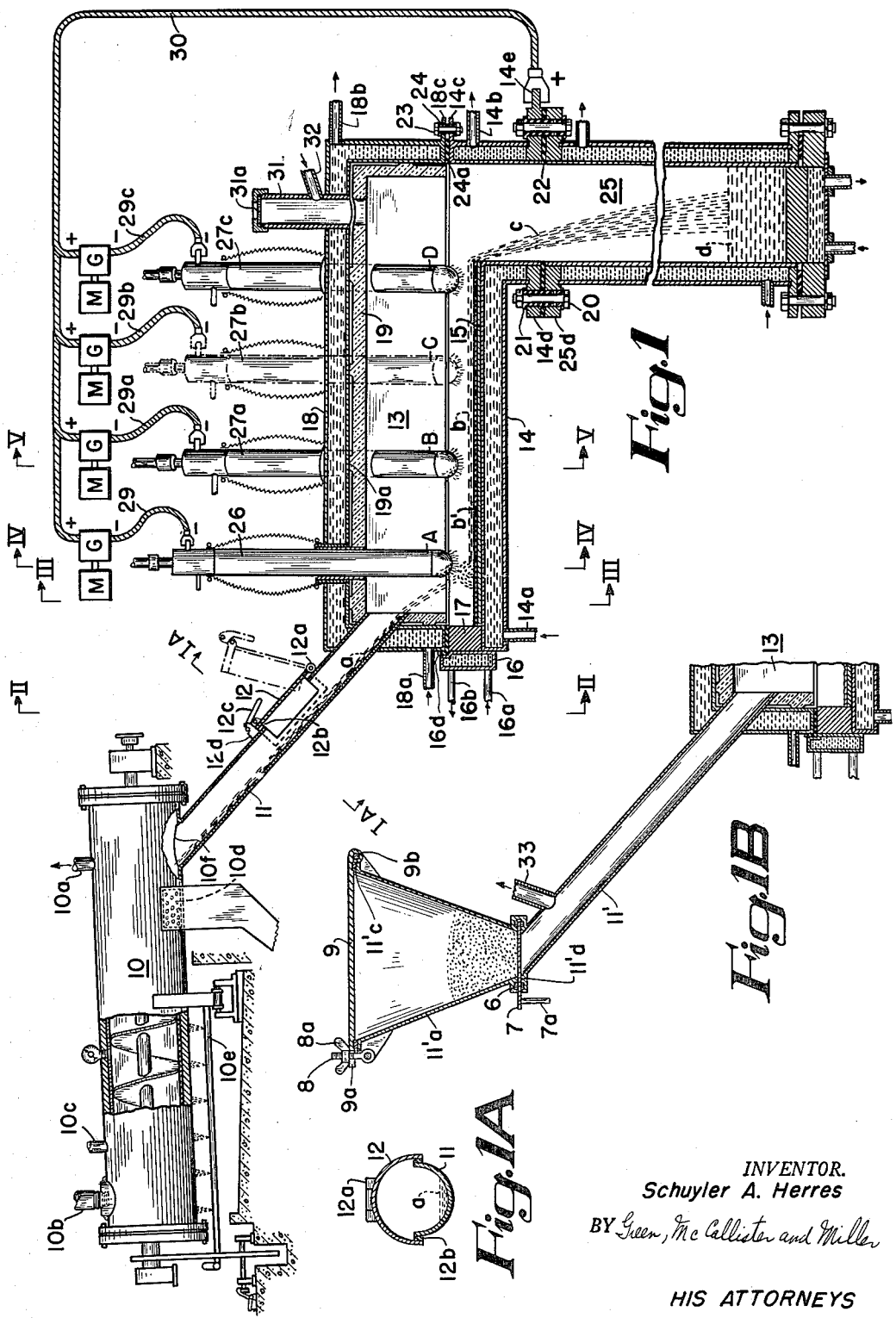
Figure 1A is an enlarged sectional detail taken along the line 1A—1A of Figure 1.
Figure 1B is a side sectional fragmental view showing a modified feed arrangement for the furnace of Figure 1.

In employing my invention, a reducing metal of the type of magnesium or sodium is introduced in molten form and in at least a stoichiometric amount (preferably in a slight excess of such amount) into a hermetically closed or sealed off reaction tube and into a reacting relationship with a halide of titanium (bromide, chloride, iodine or floride) and preferably titanium tetrachloride, which is a liquid at normal room temperatures, see my above copending application. An exothermic reaction is initiated by heating the chamber of the reaction tube and its contents to a temperature of about 1500° F. After such reaction has started, the reaction chamber is cooled to maintain the reaction at a temperature within a range of about 1475 to 1650° F. During the reaction, a spiral screw agitates the materials, thereby aiding such reaction and completing it to the extent of substantially the full amount of the titanium compound that is introduced. It also continuously breaks up the reaction product or compound and segregates it from the titanium metal, while the compound is in a substantially molten condition and the titanium is in a solid state. Since titanium melts at about 3263° F., it will be apparent that the temperature of the reaction chamber of the tube is substantially below the melting point of the titanium metal or value content. This operation effects a full separation of the titanium value in a somewhat unrefined state. The molten impurities which may include any excess reducing material, as well as the reaction compound are first removed in a molten state from the reaction tube chamber by passing them through a fine mesh screen. The solid titanium metal particles, being in sponge or somewhat small mass form, are moved over this screen and are then separately removed from the reaction tube.

I then conduct such unrefined titanium metal (without exposing it to the atmosphere) directly or continuously into a melting furnace where it is preliminarily heated at position A to volatize and drive off its impurities. The refined metal is melted and passed over a hearth in fluid or molten form into an ingot crucible or mold where it is built up and solidified. After a sufficient length of ingot, e. g., 5 to 30 feet, has been provided, it is then removed from the mold through an air lock chamber. If such a chamber is not used, the apparatus is evacuated by vacuum and then refilled with an inert gas. In this connection, a gas such as helium, argon, or neon which is inert to the metal or value content is flowed through the furnace chamber during the refining and melting operation in such a manner as to segregate the volatilzed impurities and float and carry them out without exposing the refined molten metal to them. In this manner, I have been able to directly or continuously produce metal ingots of superior quality from metal compounds, without at any time, exposing the refined metal to atmospheric or other contamination. I have also employed means for continuously withdrawing the ingot (as it is built up) from the bottom of the crucible through a fluid seal and also, an auxiliary hot top electrode to aid in building up the ingot; these means are not disclosed in my present application.

Also in accordance with my present invention, acid-leached titanium powder, vacuum distilled titanium sponge, or titanium scrap may be introduced into the furnace, refined, melted and solidified in ingot form. Such metal values may be introduced independently of or supplemental to feed of the titanium sponge produced in the reaction chamber. If the desired ingot is to be an alloy, the alloying ingredients may also be introduced to the melting furnace in this manner. It will be apparent that I have eliminated prior tedious and complex separating or segregating procedure and refine the metal into a highly pure form, when as contemplated, the value metal is fed directly from the reaction chamber into my melting furnace. The melting furnace is utilized to both refine the metal, melt it, and then flow it to an ingot-forming mold or crucible.

Since the reaction tube 10, see Figure 1, is of the same general construction as the tube 10 of my previously-mentioned copending application, Serial No. 109,885, I will omit specific reference to details of such construction in the present application. However, instead of providing a discharge chute with a vacuum seal, I have in the present application, provided a sealed-off connecting chute 11 which directly feeds the titanium sponge to a refining and melting furnace 13. Also, the reducing material is introduced through a top inlet 10b. As set forth in my copending application, titanium halide is introduced through an inlet 10c, the molten reaction product is removed through the screen 10d, the carriage 10e has a burner header as well as a cooling fluid header, and the reduced titanium metal in solid form is removed through outlet 10f.

The connecting chute 11 is shown provided with a gasketed inspection door 12 which is hinged to the chute at 12a; alloy and other additions may also be preliminarily introduced through this door when the apparatus is not in operation and preferably, before the apparatus has been evacuated to remove contaminating gases. Heat-resistant gasket material 12b provides a fluid-tight seal when the door 12 is closed. Latch parts 12c and 12d secure the door 12 in a closed position.

Since, as will hereinafter appear, the chamber of the furnace 13 operates at a much higher temperature than the reaction tube 10, vapors, volatilized impurities and inert gas in the furnace 13 will have a higher pressure than vapors or gases in the tube 10. The connected operating arrangement is such that hotter inert gas from the furnace 13 will flow along the roof of the connecting chute 11, counter to the feed flow of the metal into the downstream zone or delivery end of the chamber of the tube 10, and out of the outlet 10a. I utilize this diverted flow to preliminarily drive off impurities from the titanium metal which are of a more volatile nature, before the metal reaches the furnace 13. That is, although there is a temperature drop as the vapors or gases flow along the chute 11 and into the tube 10, the retained heat is however sufficient to volatilize lower boiling point impurities (such as moisture and gaseous impurities of the nature of hydrogen, oxygen, and nitrogen) which are then carried by the inert gas from the chute 11 and out of outlet 10a.

By way of example, the temperature of the inert gas entering the lower end of the chute 11 may be about 3300° F. and will always be higher than the maximum temperature of about 1650° F. at which the reaction tube 10 operates. However, I have determined that the temperature drop in the chute 11 (a minimum of about 1200° F.) and more importantly, the relatively segregated, directed-counter flow is sufficient to avoid volatilization of molten reaction products being removed from the screen of the discharge chute 10d.

I prefer to operate the furnace 13 at a temperature sufficient to not only volatilize any residual chlorides (magnesium or sodium) in the metal being introduced, but also to carry them in a volatilized state up into the delivery end of the reaction tube 10 where they will condense and drain off in a molten state through the screen 10d. Since these chlorides have a boiling point of about 2100° F., their temperature should be at least about 3300° F. on entering the chute 11 from the furnace 13 if the temperature drop in the latter is about 1200° F.

Figure 3:
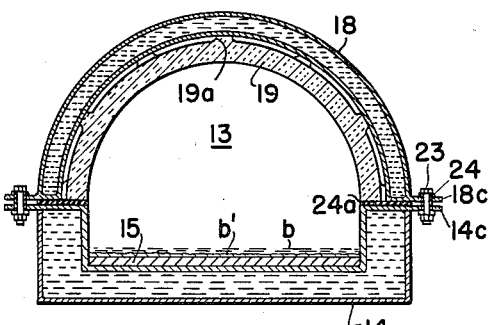
Figure 3 is an enlarged end section in elevation taken along the line III—III of Figure 1.

The furnace 13, as shown, has a water-jacketed hearth 14, preferably of copper or an alloy thereof, which has a cooling fluid inlet 14a and an outlet 14b. It will be noted in Figure 3 that the hearth 14 is of rectangular section and extends upwardly along the sides of the furnace to a height well above the level of metal to be processed. The temperature of the hearth is maintained below the melting point of the titanium (3263° F.) or other metal value to be processed and for this reason, it may be provided with a bottom liner 15 of carbon or steel upon which a thin layer of the titanium or other metal value to be processed is solidified.

The furnace 13 also has a water-jacketed arch wall construction 18 which provide top, front, and back walls for the furnace, as well as side walls above the operating level of the metal on the hearth 14. The arch roof construction 18 which may be of steel has a cooling fluid inlet 18a and an outlet 18b.

Figure 2:
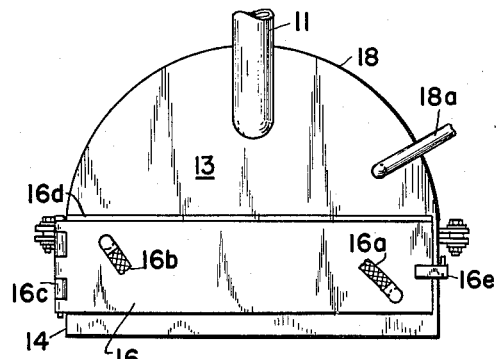
Figure 2 is an enlarged front end view in elevation taken along the line II—II of Figure 1 and showing a refining and melting furance construction of my invention.

A water-jacketed front door 16 is provided with a cooling fluid inlet 16a and an outlet 16b and is hinged at 16c, see Figure 2, to a front wall portion of the hearth 14. It carries a copper or copper alloy backing member 17 which is positioned between the hearth 14 and the front wall of the arch roof construction 18. Heat-resistant insulating material 16d, see Figure 1, carried by the door 16 and its member 17 electrically insulate them from the arch construction 18. As also shown in Figure 2, a latch 16e retains the door 16 in a closed position.

A refractory arch 19, preferably of graphite material, is positioned about the inside of the construction 18 and is spaced therefrom by positioning ribs 19a. Since the refractory arch 19 is located above the metal being processed, there is no danger of carbon contamination of the molten value content; it also protects the arch roof construction 18 so that it is not subjected to the direct heat of the melting chamber. Thus, the construction 18 may be of steel.

The water-jacketed arch roof construction 18 is provided with opposite side flanges 18c, see Figures 1 to 7, and the hearth 14 is provided with opposite side flanges 14c to secure them together as a unit. As shown particularly in Figure 3, nut and bolt assemblies 23 and heat-resistant gasket 24a of asbestos or other suitable material. In this manner, current supplied to the hearth 14 is prevented from flowing through the arch 18.

At its back or delivery end, the hearth 14 has a flange 14d of a highly conductive metal, such as copper, which closes off its cooling chamber and is secured, as by brazing to extend outwardly from the liner 15 and the outer wall of the hearth 14. An ingot mold or crucible 25, similar in construction to that shown in Figure 2 of my copending application, Serial No. 175,091, entitled "Arc Melting of Titanium to Form Ingots" and filed July 21, 1950, has a top flange 25d that is secured to the flange 14d by nut and bolt assemblies 20. Heat-resistant insulating sleeves 21 and a heat-resistant insulating gasket 22 seal off the connection and electrically segregate the hearth from the crucible 25. It will thus be noted that the hearth 14 is electrically insulated from the crucible or mold 25 and from the arch construction 18, so that the latter two parts are electrically neutral. However, insulation around each electrode, as shown, eliminates the necessity for separately insulating the hearth from the crucible.

As shown in Figure 1, substantially pure, but unrefined metal particles flow down the chute 11 into the front end of the furnace 13, where they are preliminarily heated up at position A by an electrode, such as 26 of Figure 6, to volatilize and drive off impurities whose exact composition will depend upon the nature of the titanium separating process employed. For example, titanium sponge may contain some excess reducing material (such as hydrogen or a reducing metal), moisture or a reaction product or products of the nature of reducing metal halides. Since the melting and boiling points of such impurities are well below the melting point of titanium metal, I prefer to provide an arc temperature at this point (see position A) which is about the melting point of the titanium and thus, which is well above the volatilization point of the impurities. By way of example, magnesium, calcium, sodium, potassium, lithium, or aluminum reaction product halides will volatize and rise to the top of the arch 19. Extremely volatile materials, such as hydrogen, moisture, etc., will be driven off in the chute 11, before the value metal reaches the furnace 13. This substantially eliminates spatter on the heating electrodes which otherwise presents a serious problem.

As previously pointed out, the materials that are volatilized in the furnace 13 float on and are carried by the inert gas (such as neon, helium or argon) out of the outlet 33 of the embodiment of Figure 1B or the outlet 10a of the embodiment of Figure 1. If desired, indirect arcs such as 27'a and 27'a' (see Figure 4), may be employed instead of the direct arc 26 to effect the preliminary heating up operation. The value content or titanium is then brought up and maintained at a higher melting temperature by subsequent, staggered electrodes 27a, 27b and 27c at positions B, C, etc., see Figures 1 and 5. At first, due to the low temperature of the member 15, a thin layer of titanium b' is deposited and adheres thereto in a solidified state (see Figures 1 and 3); the same is true as to the backing member 17. Then, molten, somewhat fluid metal b flows over the layer b' and along the hearth 14 towards its discharge end and as a stream c, into the mold or crucible 25. The metal value content d progressively builds up and solidifies in the mold 25 and the resultant ingot may be removed by dropping the water jacket of the mold in a manner illustrated and explained in my copending application, Serial No. 175,091.

The operation of the furnace 13 may be inspected through the tube 31 which has a sight glass 31a and of course, carries the inlet 32 for the inert gas. The electrodes may be operated either with direct or alternating current, although I have shown M. G. sets for producing direct current. Negative leads 29, 29a, 29b and 29c from the generators G are shown connected to the electrodes, if they are all of a direct arc type. A common positive lead 30 is connected to the semi-circular (copper) flange 14d of the hearth 14 by a connector lug 14e. If, as shown in Figure 4, indirect arcs are employed, a negative lead is connected to electrodes, such as 27'a and a positive lead is connected to opposed electrodes, such as 27'a'.

Figure 4:
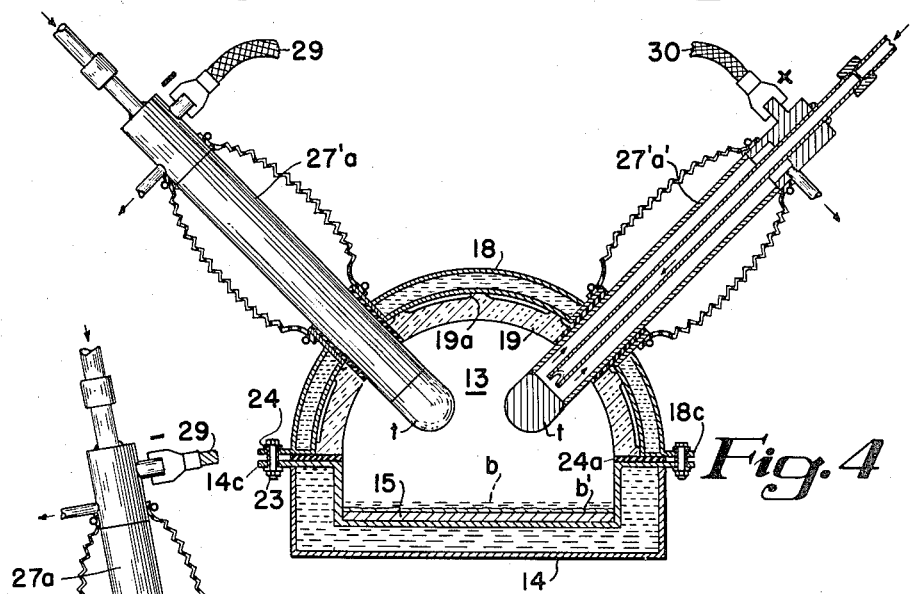
Figure 4 is a view similar to Figure 3 but taken along the line IV—IV of Figure 1.
Figure 5:
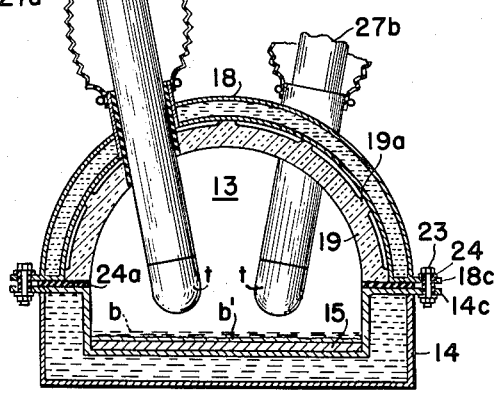
Figure 5 is a view similar to Figure 3, but taken along the line V—V of Figure 1.

The construction of the electrodes, shown in Figures 4, 5 and 6, is substantially the same as the construction of the electrodes illustrated in my previously mentioned, copending application, Serial No. 175,091, except that the tips t are here shown in line, or in other words, of non-angular shape. Such tips t may be of tungsten, molybdenum, or carbon while the construction of the other portions of the electrodes will be the same as described in this copending application, regardless of whether they are used to produce a direct or indirect arc. It will also be apparent that direct or indirect arcs or a combination of them may be used, but in any event, I prefer to generate a slightly lower temperature at arc position A than at succeeding stations or positions B, C and D of Figure 1.

Since each electrode station A, B, C and D is supplied by a separate generator, it will be apparent that the current on the electrode or electrodes of each station may be controlled at its generator to operate each station at a desired temperature.

In Figure 7, I have shown a consumable stick electrode 35 which is in the form of a titanium stick made by pressing out titanium sponge or powder. A mounting flange 18e is shown positioned on the top of the arch roof construction or member 18 to secure a bottom flange 43a of a vertically-extending cylindrical enclosure structure 43 thereon. Bolts 29 secure this structure in position; insulating sleeves 42a and an insulating gasket 42 seal off the joint and electrically segregate the member 18 from the enclosure 43. An opening through the top of the furnace 13 is provided with a metal sleeve 36 and a heat-resistant, insulating sleeve 37. The metal sleeve 36 is secured to the arch roof member 18 and the insulating sleeve 37 is secured within it to extend along the refractory arch member 19 to insulate and guide the stick 35 as it is advanced and consumed in the furnace. The sleeve construction 36—37 of this Figure 7 is similar to the sleeve construction employed for the non-consumable electrodes in Figures 1, 4, 5 and 6.

The consumable metal stick 35 is fed by means of a feed rod construction which has a yoke 38 secured by a bolt and nut assembly 39 to the upper end of the stick. The tongue end of the yoke 38 is secured to a second yoke 41a of the feed rod 41 by a bolt and nut assembly 40. The yokes 38 and the yoke 41a, as well as the bolt and nut assemblies 39' and 40 are preferably of a suitable current conductive material, such as copper, bronze, or a copper alloy. The upper end of the rod 41 is shown provided with a handle 41c which may be employed for manually advancing the stick 35, although a motor driven drum may also be employed for this purpose. Current of negative potential is supplied to the rod 41 which is also of a current conductive material by line 29 and a lug connector 41b.

The top of the enclosure 43 has an annular flange 43b upon which a cover plate or member 46 is secured by bolt and nut assemblies 44. The operating rod 41 extends through a hole in the cover member 46 and is electrically insulated therefrom by an insulating gasket 47 which also serves to seal off the enclosure 43. An inert gas such as argon is introduced through inlet 43c.

It will be apparent from the above description that various arrangements, combinations, and type of electrodes can be used in the refining and melting furnace 13. In Figure 1, I have shown a direct arc electrode at position A and a series of direct arc electrodes 27a, 27b, 27c which as shown in Figure 5, have a staggered relationship along the length of the hearth 14 to provide an efficient heating and melting of the metal. However, I also contemplate a straight-line of electrodes at positions A, B, C and D, which may be of the type of Figure 6 or the type of Figure 7. As a further modification, indirect electrode pairs, such shown in Figure 4, may be employed at positions B, C and D and/or at position A. The method of mounting the electrodes is described in my copending application Serial No. 175,091.

In employing a structural arrangement such as disclosed, I heat up the solid metal values a being introduced from chute 11 at position A to produce refined metal value. The still not fully refined metal is then refined and melted at position A and heated by arcs at positions B, C and D to a higher temperature such that it is in a somewhat fluid state as it flows as stream b to the opposite or rear end of the hearth 14 and falls as stream c into the mold 25. That is, I prefer to operate the arc or arcs at position A to produce a temperature somewhat closely corresponding to the belting point of the value content (3263° F. for titanium) and operate the arcs at positions B, C and D to produce a higher temperature (e. g. for titanium, about 3300 to 9000° F.) which is below the boiling point of the value content. The latter temperature is preferably at least about 50 to 100° F. higher than the melting point of the metal value. The voltage on the arcs may vary between 40 to 200, with about 100 volts preferred after the arcs have been established. Current of a maximum of about 10,000 amperes has been employed, but a good working average is between about 600 to 1800 amperes.

The graphite arc or lining 19 which is located above the melting line, efficiently reflects heat towards the hearth 14. The chamber of the furnace 13 is sealed off from the atmosphere, so that melting and refining operation is carried on in an inert atmosphere which is preferably provided by employing a gas such as argon, neon, or helium, after the furnace has been evacuated of air. Air seals have been provided around each of the electrodes and around all inlets and outlets, the furnace door, etc.

As a further modification, I have also employed atomic hydrogen arcs by bringing a stream of hydrogen into and around each indirect arc pair of Figure 4. The hearth construction prevents the flowing molten titanium stream from coming into direct contact with its surface and insures a uniform flow into the mold or crucible 25. Since spattering has been eliminated, tips $t$ of carbon may be employed, instead of tungsten.

The inert gas such as argon, neon or helium introduced through inlet 32, sweeps the chlorides and other impurities back through the chute 11 as a mist or vapor.

In Figure 1B, I show an alternate arrangement for introducing scrap metal, alloy metal, acid-leached titanium powder or partially distilled titanium sponge metal into the furnace 13. Chute 11' has a hopper 11'a for receiving such metal which is introduced through an air lock provided by door 9. The door 9 is hinged to the hopper 11'a at 9b and has an open end slot or bifurcation 9a to receive a threaded locking pin 8 which is pivoted on the hopper 11'a and has a thumb nut 8a. A gasket 11'c about the lip of the hopper 11'a provides a fluid tight seal. To control continuous feed of the metal into the chute 11, a slide plate member 7 extends through a sealing gland 6 and rests upon a ring slot 11'd; it is manually adjusted to provide a desired size of opening by a handle 7a.

In the embodiment of Figure 1B, the contaminated gas and volatilized impurities are discharged through an outlet connection 33 which is mounted on the chute 11'.

As will be noted from Figure 1, the reaction tube 10 is shown inclined upwardly towards its delivery end. The purpose is to maintain a pool of magnesium (or sodium) and its chloride at the entrance and in which titanium particles will grow in size until they are lifted out of the pool and advanced over the screen 10d to the delivery opening 10f by the jack screw.

What I claim is:

1. In removing impurities from unrefined titanium metal which is subject to carbon and air contamination, and in melting and directly building up a pure high quality metal ingot therefrom in an enclosed arc-melting furnace having a longitudinally-extending hearth terminating at its front end in an ingot mold and having a feed chute open to the opposite end of the hearth above a melting level therein, the method which comprises, introducing unrefined metal in solid form through and along the feed chute into the furnace at the opposite end of the hearth, maintaining an atmosphere within the furnace that is non-contaminating of the metal, preliminarily heating the thus-introduced metal at such opposite end of the hearth to a temperature well above the volatilizing point of impurities therein and to about the melting point of the metal and refining the metal thereat by releasing the volatilized impurities therein; melting the thus-purified metal and, after the metal has been melted into a molten condition, increasing and maintaining the temperature of the molten metal from such opposite end of the hearth well above its melting point and below its boiling point, while flowing it along the hearth from such opposite end thereof into the ingot mold, solidifying the molten metal within the mold and progressively building up an ingot therein; establishing and maintaining a confined positive flow of inert gas from the front end of the hearth along and above the molten metal therein towards the opposite end thereof, flowing the volatilized impurities with the positive flow of inert gas out of the furnace from such opposite end of the hearth through the chute, along the unrefined metal being introduced along the chute, and out of the chute adjacent an opposite end thereof; maintaining a positive flow of such volatilized impurities in a volatilized state during their movement from the furnace and along and out of the chute, while volatilizing and carrying away impurities of higher volatility from the unrefined metal of solid form in the chute with the previously-mentioned positive flow of inert gas and volatilized impurities.

2. A method as defined in claim 1 wherein, the refined metal is heated and maintained at a temperature of at least about 50° to 100° F. higher than the melting point of the metal while it is being flowed from the opposite end of the hearth therealong and into the ingot mold.

3. A method as defined in claim 1 wherein, the temperature of the bottom of the hearth is maintained below the melting point of the metal, a solidified layer of the metal is built up along the bottom of the hearth, and the molten metal is flowed over the solidified metal into the ingot mold.

4. In producing unrefined solidified metal and melting and refining it to build up a pure metal ingot in a continuous process, wherein the unrefined metal is processed in accordance with the method of claim 1 and wherein, a compound of the metal is initially utilized in an enclosed reaction chamber connected at its discharge end portion to the outer end portion of the feed chute, the preliminary steps which comprise, introducing the metal compound into the opposite end of the reaction chamber and advancing it along the chamber towards the feed chute, while converting the metal compound into unrefined metal in solid form and a reaction product and segregating and removing the reaction product from the reaction chamber, directly introducing the unrefined metal in solid form from the reaction chamber into the feed chute, and maintaining a reaction temperature within the reaction chamber below the melting point of the metal.

5. A method as defined in claim 4 wherein, the volatilized impurities from the outer end portion of the feed chute are introduced to the discharge end portion of the reaction chamber and are exhausted from such end portion of the chamber in a volatilized state.

6. In processing titanium metal which is subject to carbon and air contamination, and in directly building up a pure high quality metal ingot therefrom in an enclosed arc-melting furnace having a longitudinally-extending hearth terminating at one end in an ingot mold, the method which comprises, introducing the metal in solid form into the furnace at the opposite end of the hearth, maintaining an atmosphere within the furnace that is non-contaminating of the metal, preliminarily heating the thus-introduced metal at such opposite end of the hearth to a temperature well above the volatilizing point of impurities therein and to about the melting point of the metal and refining the metal by releasing the volatilized impurities, melting the thus-purified metal at such opposite end of the hearth, maintaining the bottom of the hearth at a temperature below the melting point of the metal, building up a solidified layer of the metal along the bottom of the hearth, flowing the molten metal from such opposite end of the hearth along and over the solidified layer of the metal into the ingot mold while heating the flowing metal to a substantially fluid state below its boiling point and maintaining it in such a state until it is flowed into the ingot mold, flowing an inert gas and the volatilized materials out of the furnace countercurrently to the flow of molten metal to avoid re-contaminating such molten metal, and solidifying the fluid metal within the mold and progressively building up an ingot therein.

7. In removing impurities from unrefined titanium metal which is subject to carbon and air contamination, and in melting and directly building up a pure high quality metal ingot therefrom in an enclosed arc-melting furnace having a longitudinally-extending hearth therealong terminating at a front end in an ingot mold, having a progressive series of melting electrodes disposed along the hearth from the opposite end thereof towards the ingot mold, and having a feed chute open to the opposite end of the hearth and above a melting level therein, the method which comprises, maintaining an atmosphere within the furnace which is non-contaminating of the metal, preliminarily heating the thus-introduced metal in solid form by a melting arc at an initial position at such opposite end of the hearth to a temperature above the volatilization point of less volatile impurities in the unrefined metal, refining the metal by volatilizing such impurities in its initial position on the hearth, melting the thus-refined metal into a substantially fluid state and maintaining the metal in such a state by the application of higher temperature melting arcs along the hearth, while advancing the fluid metal along the hearth from its initial position over a solidified bottom layer of the metal into the ingot mold, solidifying the molten metal within the mold and progressively building up an ingot therein; establishing and maintaining a confined positive flow of inert gas from the front end of the hearth along the hearth and above the fluid metal therein to the opposite end thereof; flowing the impurities volatilized at the initial position of the metal with the positive flow of inert gas out of the furnace from the opposite end of the hearth through the chute, along the unrefined metal of solid form being introduced through the chute, and out of the chute adjacent an outer end thereof; and maintaining such volatilized impurities in a volatilized state during the movement from the furnace and along and out of the chute, while volatilizing and carrying away impurities of higher volatility from the unrefined metal of solid form in the chute with the previously-mentioned flow of inert gas and volatilized impurities.

References Cited in the file of this patent

UNITED STATES PATENTS

| | | |
|---|---|---|
| 1,904,684 | Greene | Apr. 18, 1933 |
| 2,060,133 | Summey | Nov. 10, 1936 |
| 2,121,084 | Kruh | June 21, 1938 |
| 2,446,637 | Crampton | Aug. 10, 1948 |
| 2,537,067 | Lilliendahl | Jan. 6, 1951 |
| 2,541,764 | Herres | Feb. 13, 1951 |
| 2,546,320 | Rostron | Mar. 27, 1951 |
| 2,564,337 | Maddex | Aug. 14, 1951 |

FOREIGN PATENTS

| | | |
|---|---|---|
| 354,785 | Great Britain | Aug. 10, 1931 |